Figure 1:
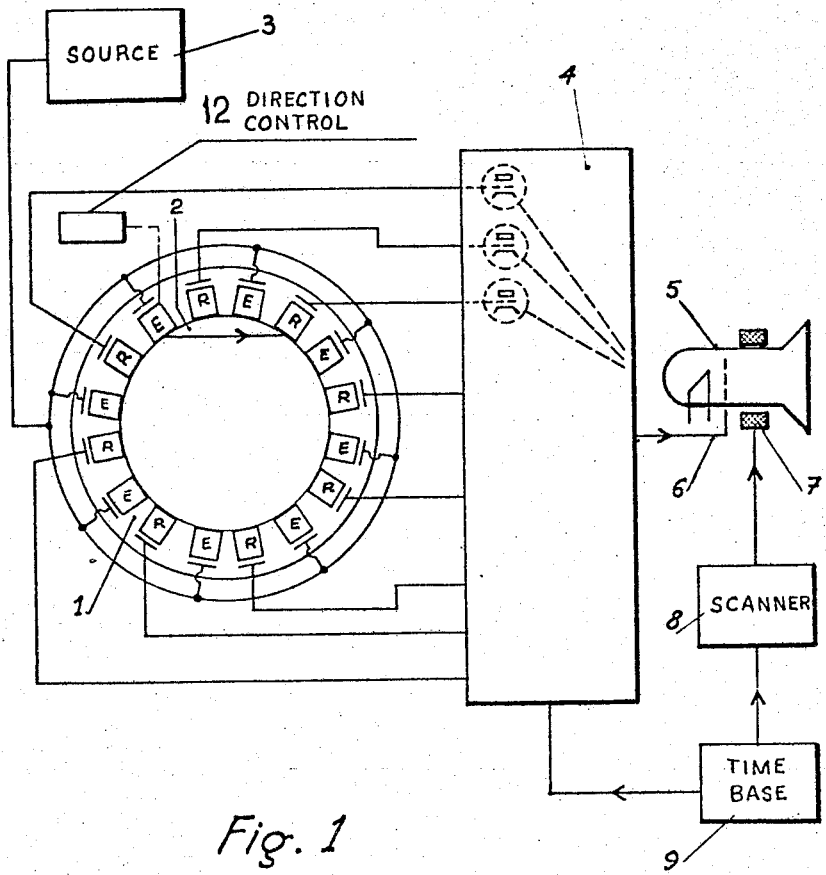

Sept. 4, 1962      JEAN-JACQUES RENAUT ET AL      3,052,115
ULTRASONIC APPARATUS FOR EXAMINING THE INTERIOR OF SOLID BODIES
Filed Feb. 13, 1959                                2 Sheets-Sheet 1

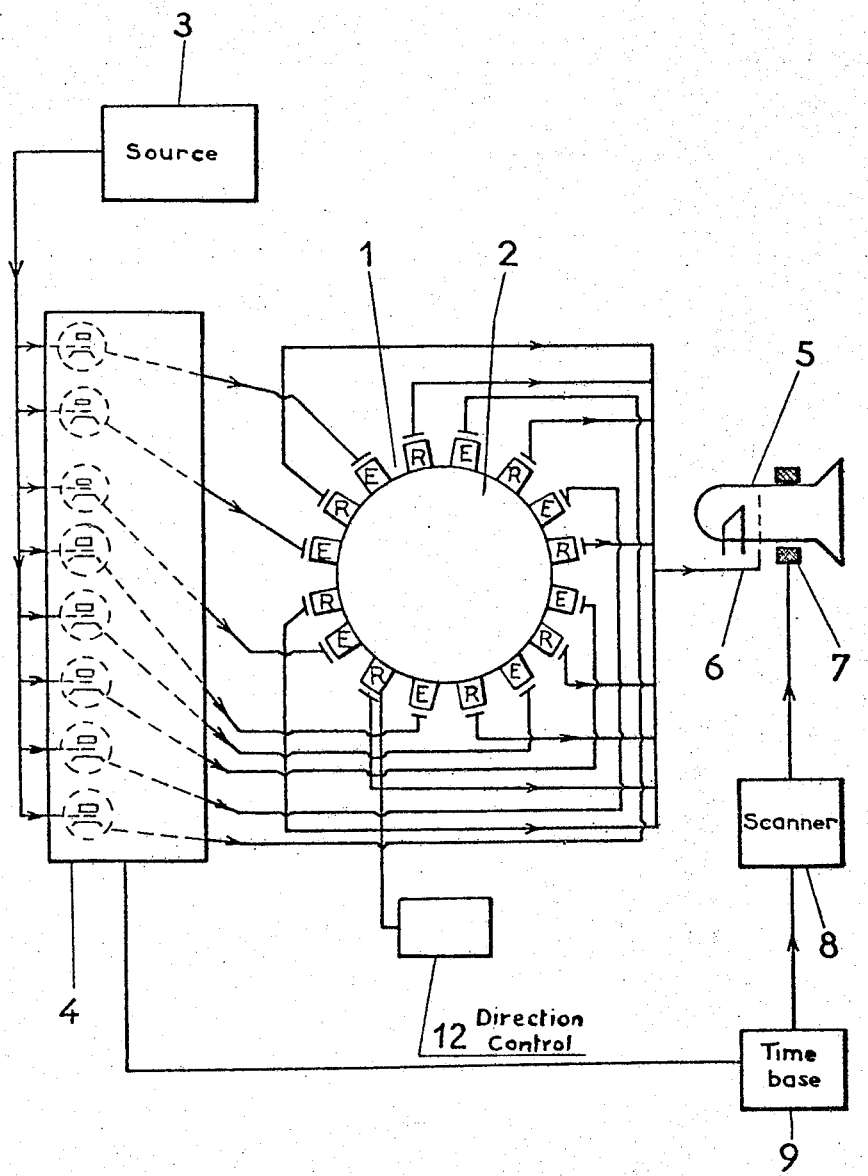

United States Patent Office 3,052,115
Patented Sept. 4, 1962

3,052,115
ULTRASONIC APPARATUS FOR EXAMINING
THE INTERIOR OF SOLID BODIES
Jean-Jacques Renaut and Jacques Dory, Meaux, France, assignors to Societe Realisations Ultrasoniques, Meaux, France, a corporation
Filed Feb. 13, 1959, Ser. No. 793,160
Claims priority, application France Feb. 14, 1958
6 Claims. (Cl. 73—67.5)

The present invention relates to the examination, by means of pressure waves, and, more particularly, by means of supersonic waves, of solids, the shape of which (cylindrical or spherical for instance) does not allow an easy exploration of the various points of the solid considered.

By way of example only, the present specification is more particularly concerned with the examination of cylindrically shaped bodies, but it is to be understood that the invention may also be applied to the examination of solids of quite different shapes.

If it is desired to examine, for instance, cylinders of compressed powder, in order to detect internal air traps, the conventional ultrasonic inspection methods usually applied to rails, plates or other bodies which are not scanned along a closed up surface, are rather difficult to apply. For instance, on causing a piezo-electric transducer to move along the surface of a cylinder, a satisfactory acoustical contact between said transducer and said surface is not readily achieved. Also, it is difficult to rotate, in stable engagement with a stationary transducer, a cylindrically shaped body which has been rapidly positioned on a support by means of an automatic device, in an automatically operated production and control line.

According to the invention there is provided a plurality of small piezo-electric transducers which completely surround the body to be examined, so as to cause a sufficient number of small supersonic beams to penetrate within the mass of the whole body for probing each part thereof, the sharpness of the scanning and, consequently, the number of the transducers being in proportion to the requirements of the analysis to be effected, and the transmission transducers or, preferably, the reception transducers are sequentially connected to a device adapted to display the results of the examination.

Preferably, the display device includes an oscilloscope wherein a circular scanning is effected in synchronism with the switching of said reception transducers.

A first embodiment of the invention comprises a plurality of transmission transducers alternating with reception transducers, arranged on a rigid support shaped as a tore or as a cylindrical crown, the reception transducers being connected to display means through an electronic switch.

According to an alternative embodiment of the invention, the transducers are supported on a flexible strip which is applied on the body examined so as to enclose it completely.

Figure 2:
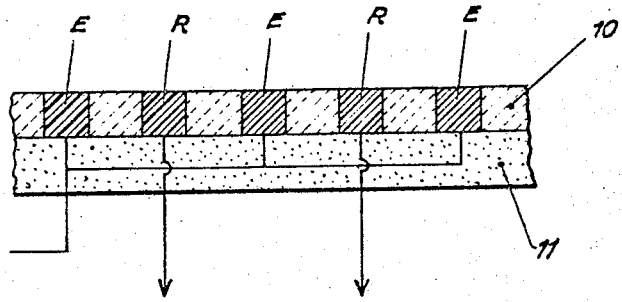

The invention will be best understood from the following description and appended drawings, wherein:

FIG. 1 is a diagram showing ultrasonic testing device according to a first embodiment of the invention, FIG. 2 is a partial cross-sectional view of a flexible strip according to an alternative embodiment of the invention; and FIGURE 3 shows a variation of the device shown in FIG. 1.

Referring to FIG. 1, a plurality of small transducers of piezo-electric ceramic for instance, alternately transmitters (E) and receivers (R), are mounted in a support 1 of insulting fibre, shaped for instance as a tore, in such a manner that one of its faces is in intimate contact with the cylindrical piece 2 to be examined.

All transmitter transducers E are connected to a generator 3 which provides a permanent electric oscillation at a supersonic frequency. The supersonic wave thus transmitted by each one of the tranducers E propagates through body 2 and, provided it is not intercepted by a flaw in the material of the solid, reaches one of the reception transducers R.

Each of the transducers may be pivoted by means of any suitable system 12 of a conventional type which for the sake of the clarity of the drawing has been shown, very diagrammatically, for one of the transmitter transducers E only. This pivoting takes place about an axis perpendicular to the plane of the drawing thus enabling possible faults to be probed, along the most suitable angle of interception by the supersonic beam, and to adjust the direction of each beam so that, if no fault has been detected, said beam should reach a reception transducer under a suitable angle.

The reception transducers R are connected to an electronic switch 4. Such a device is well known in the art and need not be described here in detail. The electronic switch transfers to the control grid 6 of an oscilloscope 5 the electrical signals produced by the reception transducers R, in the following manner:

A time base 9 renders sequentially conductive, during a short time interval, each one of the tubes which form the electronic switch 4 and which correspond each to a given receiver R. The time intervals during which the electrical signals derived from the respective receiver transductors R are transmitted to grid 6 thus follow sequentially during each operating cycle of the time base 9. Time base 9 also controls a scanning deflector 8 which, in conjunction with the deflection coils 7 effects circular scanning of the screen by the electronic beam of the oscilloscope: each complete circular scanning corresponds to each complete transmission cycle of the signals derived from the various reception transducers R.

The persistence time of the screen is longer than the duration of this cycle. Accordingly there will appear on the screen a continuous luminous circle in the absence of any defects, said circle presenting dark portions if defects are present in the material.

It has been found that this type of scanning gives a most suitable representation of the interval state of a body of revolution, for instance a cylinder or a sphere.

FIGURE 3 shows an alternate embodiment of the invention. In this embodiment all the receiver transducers R are permanently connected to electrode 6 and switch 4, instead of being inserted between transducers R and electrode 6, is inserted between source 3 and the transmitter transducers E, the time base 9 remaining of course connected to switch 4. It is obvious that the result is the same as in the case of FIG. 1, since transducers R are sequentially energized by the sequentially energized transducers E.

It is to be understood that, for testing an object having an elongated cylindrical shape, a plurality of circular sets of transducers as that shown in FIG. 1 will be distributed along the length of the cylinder: the transmission transducers of the respective sets will then be driven by the same electric generator; however to each set will be associated an individual electronic switch and individual cathode ray tube means.

In FIG. 2 there is shown a strip 10 of elastic material, vinyl chloride for instance, transparent to supersonic waves, wherein a plurality of transmission transducers E and reception transducers R are embedded. Strip 10 is bonded, or secured in any other way, to a strip 11 of a material which is opaque to the propagation of supersonic waves, for instance a spongy vinyl material: in operation, the elastic strip 10—11 completely envelopes the surface of the solid examined, by closely adapting itself to the shape thereof.

What is claimed is:

1. An apparatus for examining the interior of a body, comprising, in combination: first electro-acoustical transducers building up a first array of transducers regularly arranged in acoustical contact with at least one portion of the surface of said body along a closed line; means connected to said first transducers for generating electric oscillations, second electro-acoustical transducers building up a second array of transducers regularly arranged in acoustical contact with the surface of said body along said closed line in alternate relationship with respect to said first transducers; cathode ray tube means having a long persistence screen, means for scanning said screen along a closed path and a control electrode and switching means for sequentially connecting said second transducers to said control electrode in synchronism with said scanning.

2. An apparatus for examining the interior of a body, comprising, in combination: first directive electro-acoustical transducers building up a first array of transducers regularly arranged in acoustical contact with at least one portion of the surface of said body along a closed line; means for generating electric oscillations; second directive electro-acoustical transducers building up a second array of transducers regularly arranged in acoustical contact with the surface of said body along said closed line in alternate relationship with respect to said first transducers for respectively receiving ultrasonic signals therefrom; cathode ray tube means having a long persistence screen, means for scanning said screen along a closed path and a control electrode; means connecting said second transducers to said control electrode and switching means sequentially connecting said means for generating electric oscillations to the respective transducers of said first plurality in synchronism with said scanning.

3. An apparatus for examining the interior of a body, comprising, in combination; sets of first and second directive piezo-electric transducers regularly arranged in acoustical contact with the surface of said body and forming at least one array around said body, said second transducer being positioned in alternate relationship with respect to said first transistors and for respectively receiving ultrasonic signals therefrom; means connected to one set of transducers, for generating electric oscillations; cathode ray tube means having a long persistence screen, means for scanning said screen along a closed path and a control electrode; and switching means sequentially connecting transducers of the other set to said control electrode in synchronism with said scanning.

4. An apparatus according to claim 3 having said transducers forming at least one circular array around said body and a toroidal insulating rigid suport in which said transducers are mounted.

5. An apparatus according to claim 3, comprising means for varying the orientation of said transducers with respect to said surface.

6. An apparatus according to claim 3, having said transducers forming at least one circular array around said body, a flexible insulating support strip of an elastic material transparent to ultrasonic waves in which said transducers are embedded.

References Cited in the file of this patent

UNITED STATES PATENTS

| | | |
|---|---|---|
| 2,164,125 | Sokoloff | June 27, 1939 |
| 2,578,505 | Carlin | Dec. 11, 1951 |
| 2,700,895 | Carson | Feb. 1, 1955 |
| 2,908,161 | Bincer | Oct. 13, 1959 |

FOREIGN PATENTS

| | | |
|---|---|---|
| 736,464 | Great Britain | Sept. 7, 1955 |